United States Patent [19]
Takase et al.

[11] Patent Number: 5,963,555
[45] Date of Patent: Oct. 5, 1999

[54] ROUTER APPARATUS USING ATM SWITCH

[76] Inventors: Akihiko Takase, 20-6 Minamiogikubo-1-chome, Suginami-ku, Tokyo; Masahiro Takatori, 1545-2-B302 Totsukacho; Kazuho Miki, 643-519 Yabecho, both of Yokohama-shi; Masaru Murakami, 1745-B314 Totsukacho; Koji Wakayama, 643-415 Yabecho, both of Yokohama-shi; Tetsuro Yoshimoto, 643-206 Yabecho, Totsuka-ku, Yokohama-shi; Masao Kunimoto, 18-18 Misumicho, Chigasaki-shi, all of Japan

[21] Appl. No.: 08/923,873

[22] Filed: Sep. 2, 1997

[30] Foreign Application Priority Data

Sep. 3, 1996 [JP] Japan .................................. 8-233045

[51] Int. Cl.$^6$ ...................................................... H04L 12/66
[52] U.S. Cl. ............................ 370/395; 370/401; 370/466
[58] Field of Search ...................................... 370/395, 396, 370/397, 398, 399, 400, 401, 464, 465, 466, 470, 471, 474, 392, 389

[56] References Cited

U.S. PATENT DOCUMENTS

| | | | |
|---|---|---|---|
| 5,251,205 | 10/1993 | Callon . | |
| 5,548,589 | 8/1996 | Jeon et al. ................................ | 370/399 |
| 5,583,862 | 12/1996 | Callon . | |
| 5,623,605 | 4/1997 | Keshau et al. ........................... | 370/401 |
| 5,666,487 | 9/1997 | Goodman et al. ....................... | 370/395 |
| 5,694,554 | 12/1997 | Kawbata et al. ......................... | 370/399 |
| 5,715,250 | 2/1998 | Wantanabe ............................... | 370/401 |
| 5,719,865 | 2/1998 | Sato ........................................ | 370/395 |
| 5,764,645 | 6/1998 | Bernet et al. ............................ | 370/466 |
| 5,828,844 | 10/1998 | Civanalar et al. ....................... | 370/395 |

FOREIGN PATENT DOCUMENTS 8-125692   5/1996   Japan .............................. H04L 12/66

OTHER PUBLICATIONS

Newman, Peter, et al., *Flow Labelled IP: A Connectionless Approach to ATM*, Ipsilon Networks, Inc., Mar. 1996.

*Primary Examiner*—Chau Nguyen
*Assistant Examiner*—Kenneth Vanderpuye

[57] ABSTRACT

An LAN interface unit and an ATM switch unit cooperate to perform traffic control. A QoS unit monitors circumstances of an input buffer from a multiplexer of the ATM switch by means of a system controller and when an overflow of the input buffer is expected, the LAN interface unit of the multiplexer is instructed to perform traffic control. The LAN interface unit performs traffic control such as limitation of ATM cells inputted in the ATM switch.

5 Claims, 8 Drawing Sheets

ROUTER APPARATUS USING ATM SWITCH

BACKGROUND OF THE INVENTION

The present invention relates to a router apparatus using an ATM (Asynchronous Transfer Mode) switch to make routing of packets.

As a router apparatus using the ATM switch capable of exchanging signals at a high speed in the hardware manner to make routing of IP (Internet Protocol) packets, a product group named generically as IP switch made of IPSILON NETWORKS, Inc. is known.

FIG. 8 schematically illustrates this router apparatus.

As shown in FIG. 8, the router apparatus 1000 is connected among gateway apparatuses 2000 connected to LAN and WAN which adopt the IP.

The gateway apparatus 2000 receives IP packets from the LAN and WAN to make ATM cells and sends the ATM cells to the router apparatus 1000 while designating the defaulted VP and VC. An ATM switch 1100 of the router apparatus 1000 sends to an IP switch controller 1200 the ATM cells which designate the defaulted VP and VC. The IP switch controller 1200 restores the IP packets from the received ATM cells and investigates an address of the IP packets. The IP switch controller 1200 makes ATM cells which designate the defaulted VP and VC from the IP packets again and sends the ATM cells through the ATM switch 1100 to the gateway apparatus 2000 corresponding to the investigated address. The gateway apparatus which has received the ATM cells restores the IP packets from the ATM cells and sends the IP packets to the LAN and WAN connected thereto.

SUMMARY OF THE INVENTION

When the IP switch controller 1200 restores the IP packets from the ATM cells which designate the defaulted VP and VC received from the ATM switch 1100, the controller examines the service (FTP, HTTP, NFS, DNS, SMTP, POP, etc.) utilizing the IP packets, so that when it is the service having a heavy traffic, VP and VC which are new in a flow to which the IP packets belong are assigned to the gateway apparatus 2000 on the transmission side of the ATM cells. Further, when the gateway apparatus on the reception side of the ATM cells also receives from the router apparatus 1000 the ATM cells designating the defaulted VP and VC and restores the IP packets therefrom, the gateway apparatus examines the service utilizing the IP packets and when it is the service having a heavy traffic, VP and VC which are new in the flow to which the IP packets belong are assigned to the router apparatus 1000. The ATM switch 1100 is set so that the gateway apparatus 2000 on the reception side is caused to exchange the ATM cells received from the gateway apparatus 2000 on the transmission side and which designate the VP and VC assigned to the flow from the gateway apparatus 2000 on the transmission side as the ATM cells designating the VP and VC assigned to the flow to the gateway apparatus 2000 on the reception side.

When the gateway apparatus 2000 on the transmission side receives the assignment to the flow of the VP and VC, the ATM cells formed from the IP packets belonging to this flow are transmitted to the router apparatus while designating the assigned VP and VC.

The ATM switch 1100 of the router apparatus 1000 causes the gateway apparatus 2000 on the reception side to exchanges the ATM cells received and designating the VP and VC assigned to the flow from the gateway apparatus 2000 on the transmission side as the ATM cells designating the VP and VC assigned to the flow to the gateway apparatus 2000 on the reception side in accordance with setting.

Messages such as a request of the VP and VC and an assignment between the gateway apparatus 2000 and the IP switch controller 1200 of the router apparatus are stored in the ATM cells as the messages in accordance with a predetermined protocol named the IFMP (Ipsillon Flow Management Protocol) to be transmitted and received, and the setting/release of contents of the exchange of the ATM cells in the ATM switch 1100 by the IP switch controller 1200 between the IP switch controller 1200 and the ATM switch 1100 of the router 1000 and control of transmission of the ATM cells designating the defaulted VP and VC in the ATM switch 1100 by the IP switch controller 1100 are stored in the ATM cells as the messages in accordance with a predetermined protocol named the GSMP (General Switch Management Protocol) to be transmitted and received.

According to the router apparatus described above, the router apparatus 1000 cannot perform traffic control (priority control and congestion control of ATM cells) of the ATM cells in cooperation with the gateway apparatus 2000. Accordingly, when only the router apparatus 1000 attempts to guarantee the transfer band required in each flow, it is necessary to provide a buffer apparatus having a large capacity in the router apparatus. Further, since the router apparatus 1000 and the gateway apparatus 2000 must perform the traffic control independently, the transmission capacity cannot be used effectively as a whole.

Further, in the router apparatus, control signals such as a message conforming to the IFMP between the gateway apparatus 2000 and the IP switch controller 1200 of the router apparatus and a message conforming to the GSMP between the IP switch controller 1200 of the router apparatus and the ATM switch 1100 are all transmitted by means of the transmission path which is physically identical with the ATM cells. Accordingly, since the transmission band of the ATM cells cannot be assured to a level near to the maximum transmission capacity of the physical transmission path when more detailed control is performed, the transmission efficiency is lowered.

Accordingly, it is an object of the present invention to provide a router apparatus using an ATM switch and capable of performing various control such as traffic control more effectively.

In order to achieve the above object, according to the present invention, a router apparatus using an ATM switch to make routing of IP packets, comprises a multiplexer inputted with the IP packets for producing ATM cells from the inputted IP packets to multiplex the produced ATM cells, and an ATM switch unit for exchanging the ATM cells inputted from the multiplexer to produce the ATM cells to an ATM network, the multiplexer including shaping function for discarding the ATM cell in accordance with circumstances of the ATM network. Further, a router apparatus using an ATM switch to make routing of IP packets, comprises a multiplexer inputted with the IP packets for producing ATM cells from the inputted IP packets to multiplex the produced ATM cells, and an ATM switch unit for exchanging the ATM cells inputted from the multiplexer to produce the ATM cells to an ATM network, the multiplexer including a first interface including a line corresponding unit having an IP packet input unit for inputting the IP packets, an ATM cell producing unit for producing ATM cells with a mark indicative of a priority of the ATM cells in accordance with service of the inputted IP packet, and a shaping unit for discarding the ATM cell produced from the ATM cell producing unit in accordance with circumstances of the ATM network, and a data multiplexing unit for multiplexing the ATM cells processed by the shaping unit, and a second interface for synchronizing the ATM cells produced from the first interface.

For example, a router apparatus using an ATM switch to make routing of IP packets, comprises an ATM switch for exchanging ATM cells in accordance with VPI and VCI included in the ATM cells, a plurality of interface units connected to a network which transmits the IP packets, and an IP switch controller for making routing of the IP packets, each of the interface units including means for forming an ATM cell from a flow of the IP packets received from the connected network and transmitting to the ATM switch the ATM cell with specific VPI and VCI set to the flow in cooperation with the IP switch controller, means for receiving the ATM cells transmitted from the ATM switch and restoring the flow of the IP packets to transmit it to the connected network, means for setting specific VPI and VCI for the flow restored from the ATM cells received from the ATM switch in cooperation with the IP switch controller, and means for limiting transmission of the ATM packets to the ATM switch when traffic control is instructed from the IP switch controller, the IP switch controller including means for setting specific VPI and VCI for the flow of the IP packets in cooperation with the interface unit for source of the flow of the IP packets, setting specific VPI and VCI for the flow in cooperation with the interface unit for destination of the flow and setting contents of exchange of the ATM cells performed by the ATM switch so that the IP packets from the interface unit for source including the specific VPI and VCI set in cooperation with the interface unit for source are exchanged to the interface unit for destination as the ATM cells including VPI and VCI set in cooperation with the interface unit for destination, means for instructing the interface unit to perform traffic control when congestion occurs in the ATM switch or when occurrence of congestion is expected, and means for routing the ATM cells including the IP packets of the flow on the basis of an IP address included in the IP packet when the VPI and VCI for the flow are not set with respect to both of the interface unit for source and the interface unit for destination of the flow.

With such a router apparatus, when congestion occurs in the ATM switch or when there is a possibility that congestion occurs, transmission of the ATM cells can be limited in the interface unit at the previous stage of the ATM switch to thereby perform more effective traffic control.

DESCRIPTION OF THE PREFERRED EMBODIMENT

An embodiment of a router apparatus according to the present invention is now described.

Figure 1:
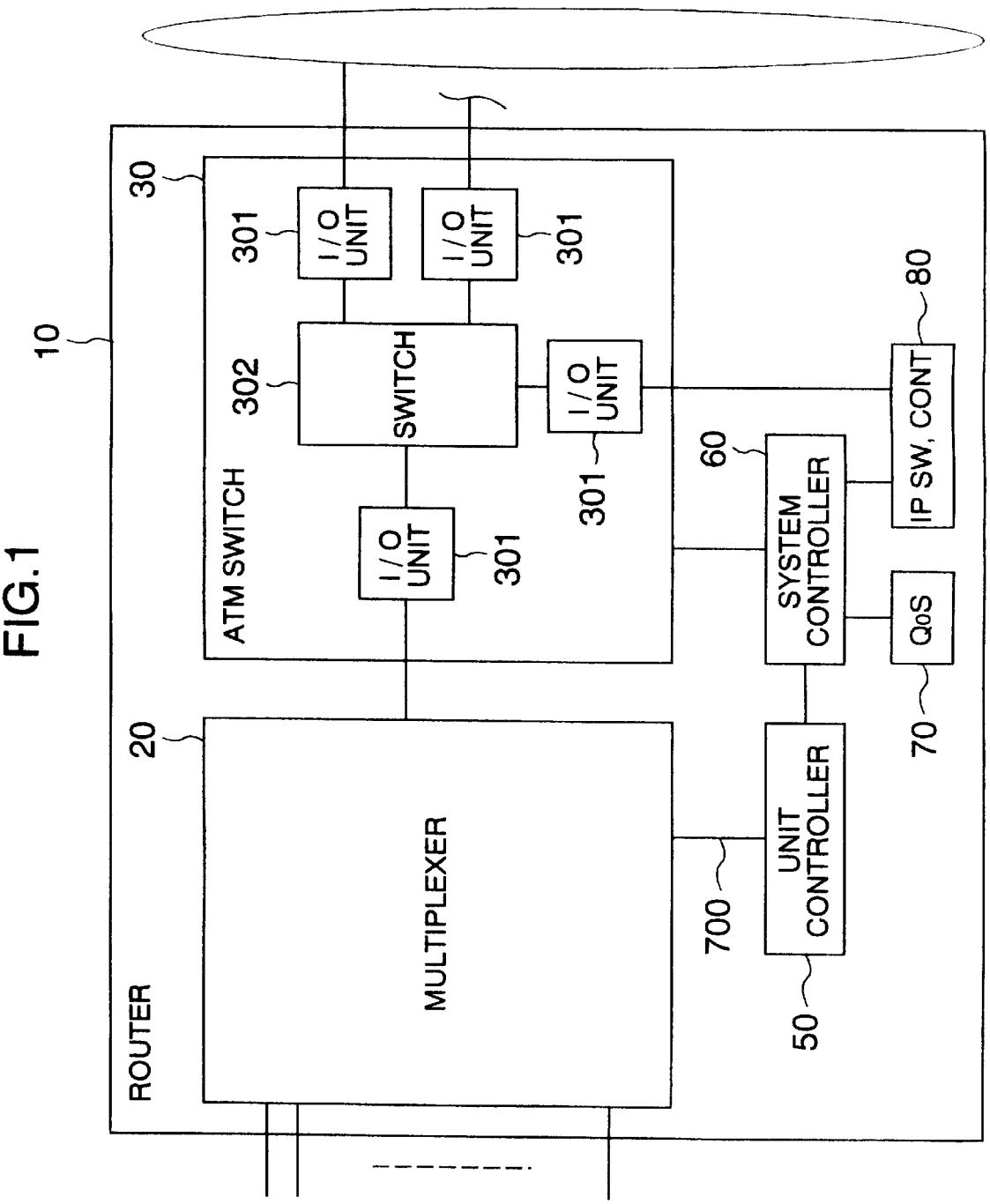
FIG. 1 is a block diagram schematically illustrating a router apparatus.

FIG. 1 schematically illustrating a router apparatus according to the embodiment.

In FIG. 1, numeral 10 denotes a router apparatus, which includes a multiplexer 20 connected to a LAN or the like, an ATM switch 30 connected to the multiplexer 20 and an ATM network or the like, an IP switch controller 80 connected to the ATM switch 30, a system controller 60 for performing control and management of the ATM switch 30 and management control of all others of the router apparatus, a quality-of-service (QoS) unit 70 for performing management and control of traffic and a unit controller 50 for performing control of the multiplexer 20. Further, the ATM switch 30 includes input/output units 301 each disposed in each transmission path for input/output and provided with a buffer, and a switch unit 302 for switching the ATM cells. The units constituting the router apparatus are not arranged or installed dispersedly as the gateway apparatuses and the router apparatus and may be accommodated in one or a plurality of housings disposed in one place to constitute the router apparatus.

Each of the units is now described in detail.

The multiplexer 20 is first described.

Figure 2:
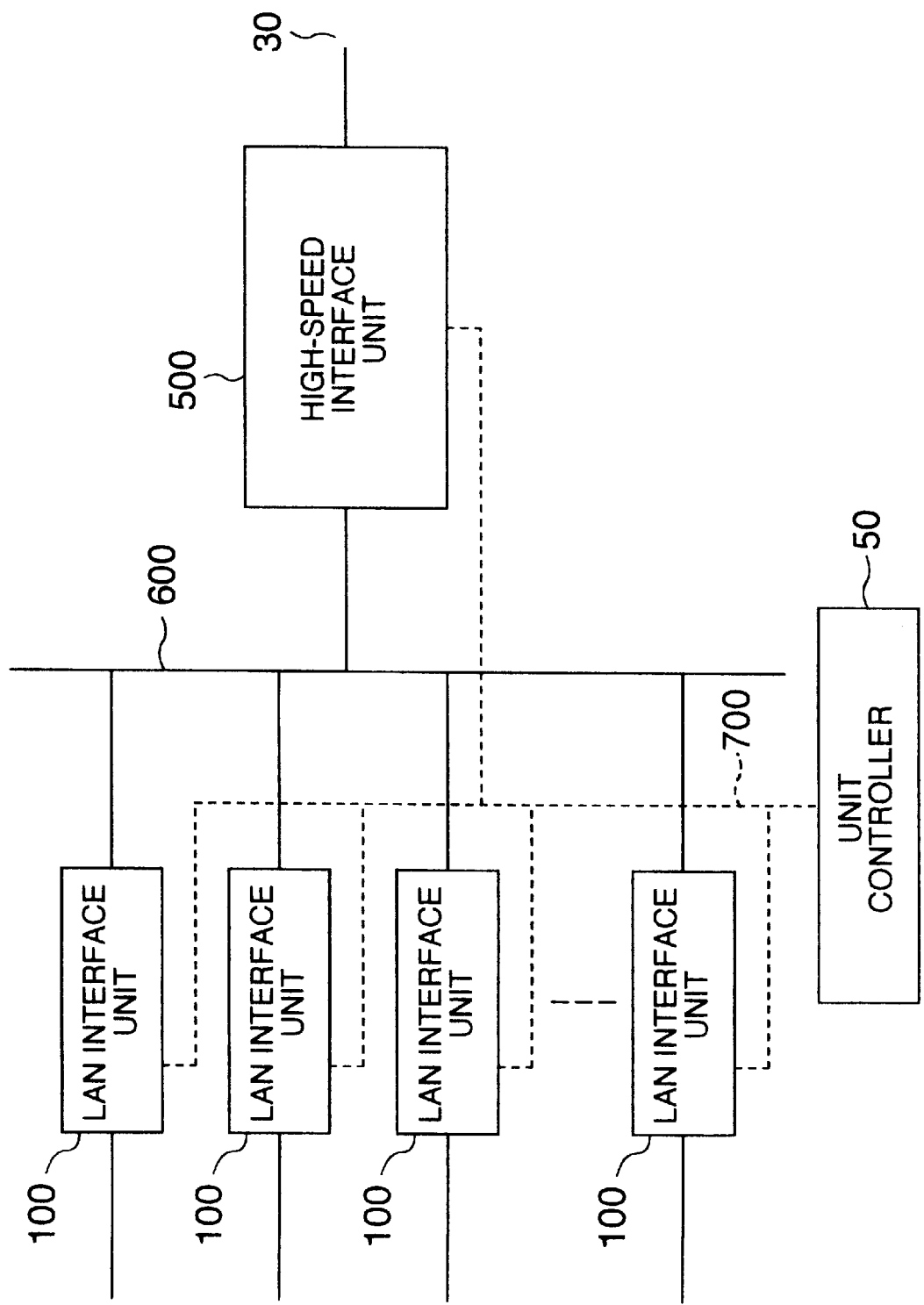
FIG. 2 is a block diagram schematically illustrating a multiplexer apparatus.

FIG. 2 schematically illustrates the multiplexer according to the embodiment.

In FIG. 2, numeral 500 denotes a high-speed interface unit accommodated in the ATM switch 30 and which accommodates a high-speed transmission path (hereinafter referred to as "high-speed ATM transmission path") which transmits the ATM cells, numeral 100 denotes a LAN interface unit which accommodates one or a plurality of low-speed transmission paths (hereinafter referred to as "LAN transmission path") constituting the LAN adopting the IP such as TCP/IP, and numeral 600 denotes a time division bus.

In such a multiplexer, the time division bus 600 transmits signals between the interface units in the time division manner. That is, time slots on the time division bus 600 are fixedly assigned between the interface units, for example, and the interface units use the time slots assigned thereto to transmit signals. Assignment of the time slots is defined so that signals transmitted on the time division bus 600 by the interface units are multiplexed in the byte multiplex manner.

The LAN interface unit 100 performs the termination process of the transmission path such as the Ethernet, the termination process of the data link, the AAL layer process of the AAL type 5 including the encapsulation of the IP packet and a part of the ATM layer process. On the other hand, the high-speed interface unit 500 performs the remainder of the ATM layer process and the physical layer process on the high-speed ATM transmission path side between the IP interface unit 500 and the high-speed ATM transmission path.

Figure 3:
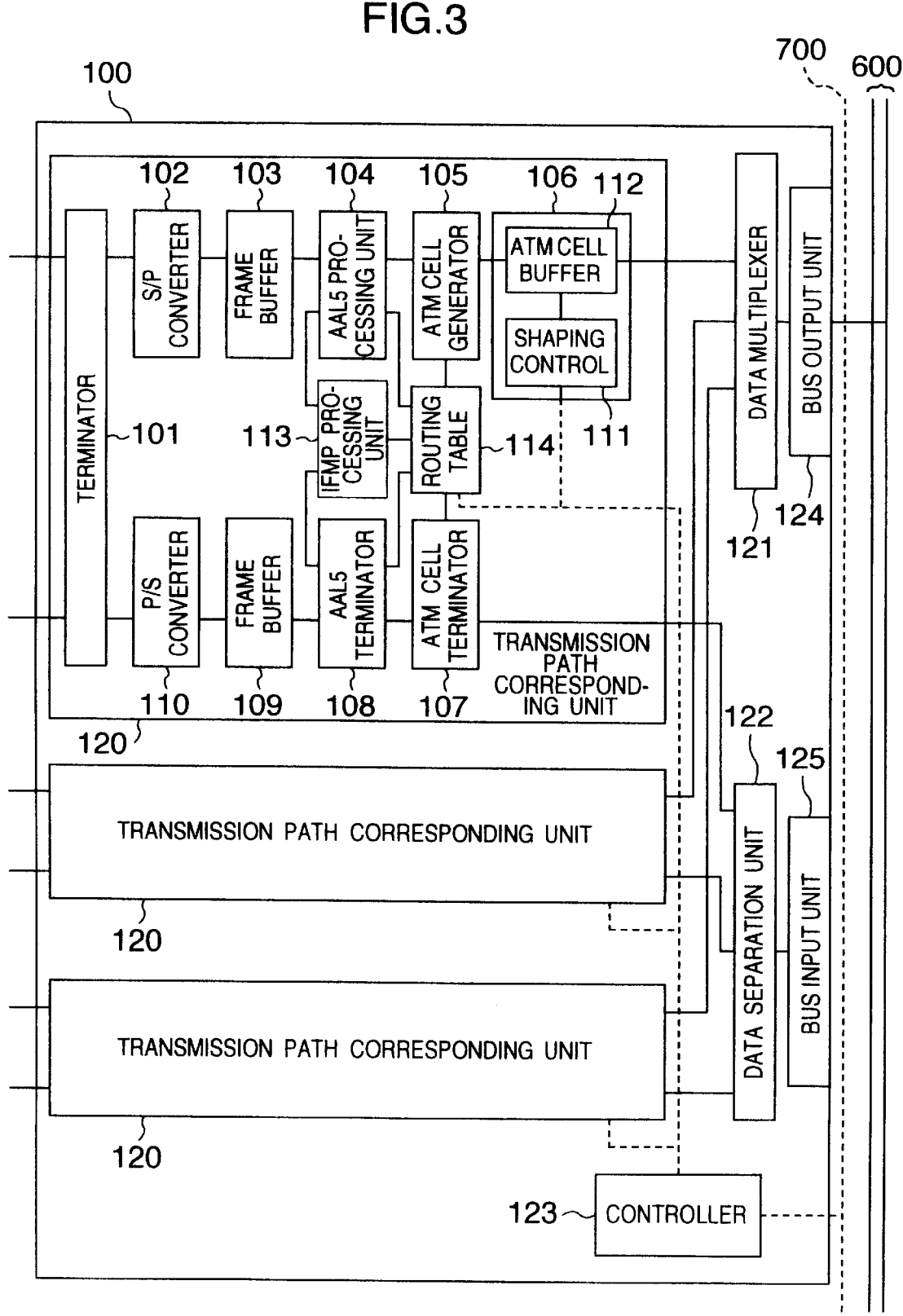
FIG. 3 is a block diagram schematically illustrating a LAN interface unit.

FIG. 3 schematically illustrates the LAN interface unit 100.

As shown in FIG. 3, the LAN interface unit 100 includes transmission path corresponding units 120 each provided in each of LAN transmission paths, a data multiplexer unit 121, a bus output unit 124, a bus input unit 125, a data separation unit 122, and a controller unit 123 connected to the unit controller 50 of FIG. 1. Further, the transmission path corresponding unit 120 includes a termination unit 101 for performing termination of the physical layer of the LAN transmission path and termination of the data link, a serial-to-parallel conversion unit 102, a frame buffer unit 103, an AAL 5 processing unit 104, an ATM cell generating unit 105, a shaping unit 106, an ATM cell termination unit 107, an AAL 5 termination unit 108, a frame buffer unit 109, a parallel-to-serial conversion unit 110, an IFMP processing unit 113 and a routing table 114. Furthermore, the shaping unit 106 includes an ATM cell buffer 112 and a shaping control unit 111 using the ATM cell buffer 112 to perform the band assurance process including abandonment of non-preferred ATM cells.

In each of the transmission path corresponding units 120, the IP packet from the LAN transmission path which has been subjected to the termination process of the physical layer and the data link layer in the termination unit 101 is converted into a parallel signal in the serial-to-parallel conversion unit 102 and is then stored in the frame buffer unit 103 once. The AAL 5 processing unit encapsulates the IP packet read out from the frame buffer unit 103 in accordance with the AAL 5 protocol by means of the LLC/SNAP or the like to form a SAR-PDU frame. The ATM cell generating unit 105 partitions the SAR-PDU frame at intervals of 48 bytes and generates ATM cells each having a payload of 48 bytes.

Figure 4:
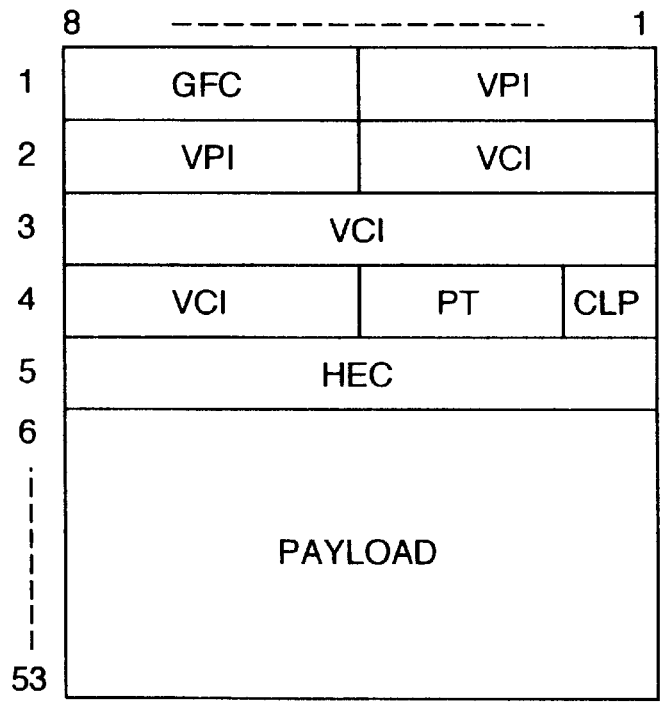
FIG. 4 shows a format of an ATM cell.
Figure 6:
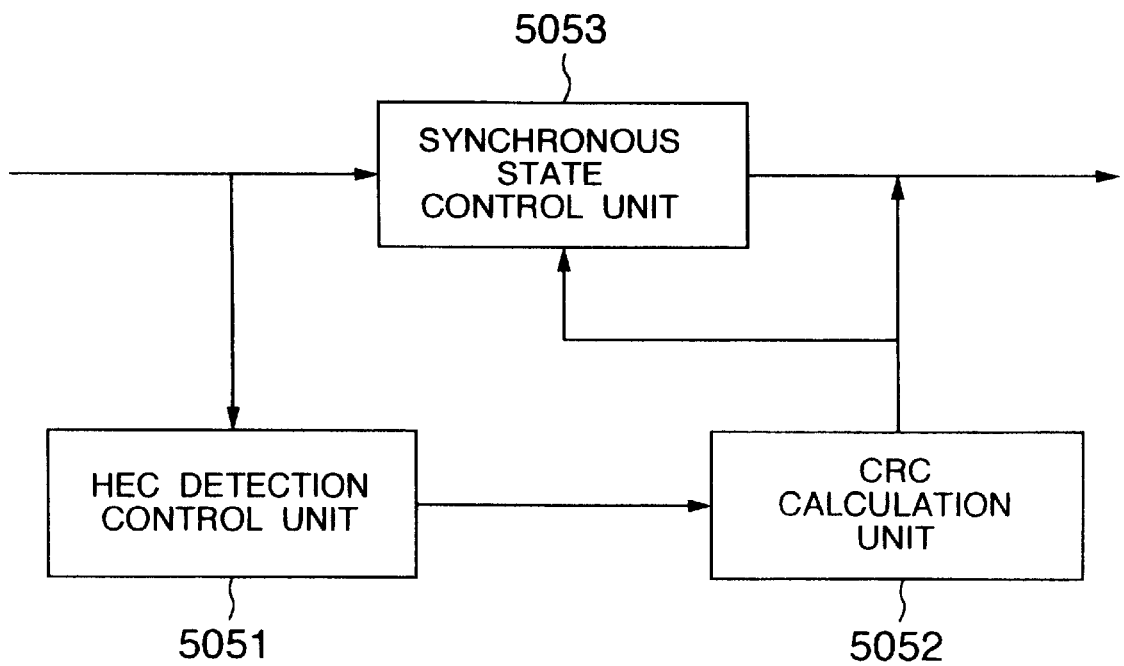
FIG. 6 is a block diagram schematically illustrating a cell synchronizing unit.

FIG. 4 shows a format of the ATM cell.

As shown in FIG. 4, the ATM cell is a fixed-length cell of 53 octets in total including the ATM header of 5 octets and the payload of 48 octets. The ATM header includes GFC for designating the generic flow control, VPI for specifying a virtual path (VP) which transmits the ATM cell, VCI for designating a virtual channel (VC) which transmits the ATM cell, PT for designating a type of the payload, CLP for displaying the priority of cell loss, and HEC for error control of the ATM header.

The process for generating the ATM cell in the ATM cell generating unit 105 includes scrambling of the payload, a process for adding the ATM header including the HEC generated for error correction and the destination address of the ATM cell to the payload and the like. The VPI and the VCI are described in the ATM header of the ATM cell with reference to the routing table 114. The VPI and the VCI are determined as follows.

The AAL 5 processing unit 104 delivers the label for specifying the flow of the IP packet included in the SAR-PDU frame to the routing table 114 and the routing table 114 delivers the VPI and VCI registered in correspondence to the label to the ATM cell generating unit 105. The ATM cell generating unit 105 describes the received VPI and VCI in the ATM header. When the VPI and the VCI corresponding to the label received from the AAL 5 processing unit 104 are not registered, 0/15 which is the defaulted VPI and VCI is delivered to the ATM cell generating unit 105. One flow is a sequence of the IP packet which is transmitted from a specific source to a specific destination in a specific protocol by a specific service. Intuitively, the flow signifies a flow of the IP packet used in one communication.

Further, the AAL 5 processing unit 104 notifies the service utilized by the IP packet included in the SAR-PDU frame to the ATM cell generating unit 105 and the ATM cell generating unit 105 sets the CLP for displaying the priority of the cell loss in accordance with the notified service.

The shaping control unit 111 controls writing of the generated ATM cell into the ATM cell buffer 112 and reading of the ATM cell from the ATM cell buffer 112 to the data multiplexer unit 121. The shaping control unit 111 performs abandonment of the non-preferred ATM cell in accordance with the indication from the control unit 123.

The ATM cells produced from the transmission path corresponding units 120 are multiplexed by the data multiplexer unit 121 and transmitted from the bus output unit 124 to the high-speed interface unit 500 at the predetermined time slot of the time division bus 600 previously assigned to the LAN interface 100.

On the other hand, the signals from the high-speed interface unit 500 at the predetermined time slot of the time division bus 600 previously assigned to the LAN interface 100 are received by the bus input unit 125 and separated into signals for each of the transmission path corresponding units 120 by the data separation unit 122 to be transmitted to the transmission path corresponding units 120. The signals transmitted to the transmission path corresponding units 120 constitute the ATM cell.

In the transmission path corresponding units 120, the ATM termination unit 107 performs the termination process of the ATM layer such as descrambling of the payload of the ATM cell and collects the descrambled payload signals to be transmitted as the SAR-PDU frame to the AAL 5 termination unit 108. The AAL 5 termination unit 108 performs the process in accordance with the AAL 5 protocol including decapsulation of the IP packet and further performs the process in accordance with the contents of the trailer and the header of the SAR-PDU frame. The AAL 5 termination unit 108 restores the IP packet and when the IP packet is directed to the LAN connected to its own transmission path corresponding unit 120, the AAL 5 termination unit 108 writes the IP packet in the frame buffer unit 109. The IP packet written in the frame buffer unit 109 is converted into a serial signal by the parallel-to-serial conversion unit 110 and is transmitted to the LAN transmission path as a signal suitable for the LAN.

Further, when the IP packet restored from the ATM packet sent from the IP switch controller 80 of FIG. 1 while designating 0/15 which is the defaulted VPI/VCI contains an IFMP message, the AAL 5 termination unit 108 sends the IFMP message to the IFMP processing unit 113.

The IFMP processing unit 113 performs the process in accordance with the received IFMP message. When the received IFMP message contains information such as the source, the destination, the protocol and the service of the IP packet specifying the flow processed in its own transmission path corresponding unit 120, the label given to the flow and a request for transmitting the flow of the label with the specific VPI and VCI, the label and the VPI/VCI are registered in the routing table 114. Further, the IFMP processing unit 113 instructs the AAL 5 processing unit 104 to deliver the label to the routing table 114 with respect to the flow of the IP packet of the source, the destination, the protocol and the service designated by the IFMP message.

On the other hand, when the IFMP message is transmitted to the IP switch controller 80 of FIG. 1, the IFMP processing unit 113 delivers the IP packet containing this message to the AAL 5 processing unit 104. The AAL 5 processing unit 104 processes the IP packet in the same manner as the IP packet from the frame buffer 103 and delivers the processed IP packet to the ATM cell generating unit 105.

The AAL 5 termination unit 108 investigates the service of the flow to which the IP packet restored from the ATM packet sent while the ATM termination unit 107 designates 0/15 which is the defaulted VPI/VCI belongs, and when it is the service (FTP, HTTP, NFS, etc.) having a heavy traffic, the label of the flow is notified to the IFMP processing unit 113. If there is no label yet, a new label is given and notified to the IFMP processing unit. The IFMP processing unit 113 which has received the notification determines new VPI and VCI for receiving the flow and produces the IP packet including the IFMP message containing information such as the source, the destination, the protocol and the service of the IP packet specifying the flow, the label of the flow, and the effect of requiring transmission of the ATM cell of the flow on the basis of the determined VPI and VCI. The IFMP processing unit 113 delivers the IP packet to the AAL 5 processing unit 104 to be transmitted to the IP switch controller 80 of FIG. 1. When the IFMP processing unit 113 is notified as the IFMP message from the IP switch controller 80 the effect that transmission of the ATM cell of the flow is accepted by the determined VPI and VCI, the IFMP processing unit 113 notifies to the unit controller 50 of FIG. 2 through the control unit 123 that the received ATM cell from the ATM switch 30 having the VPI and VCI is sent to its own transmission path corresponding unit 120.

The high-speed interface unit 500 is now described.

Figure 5:
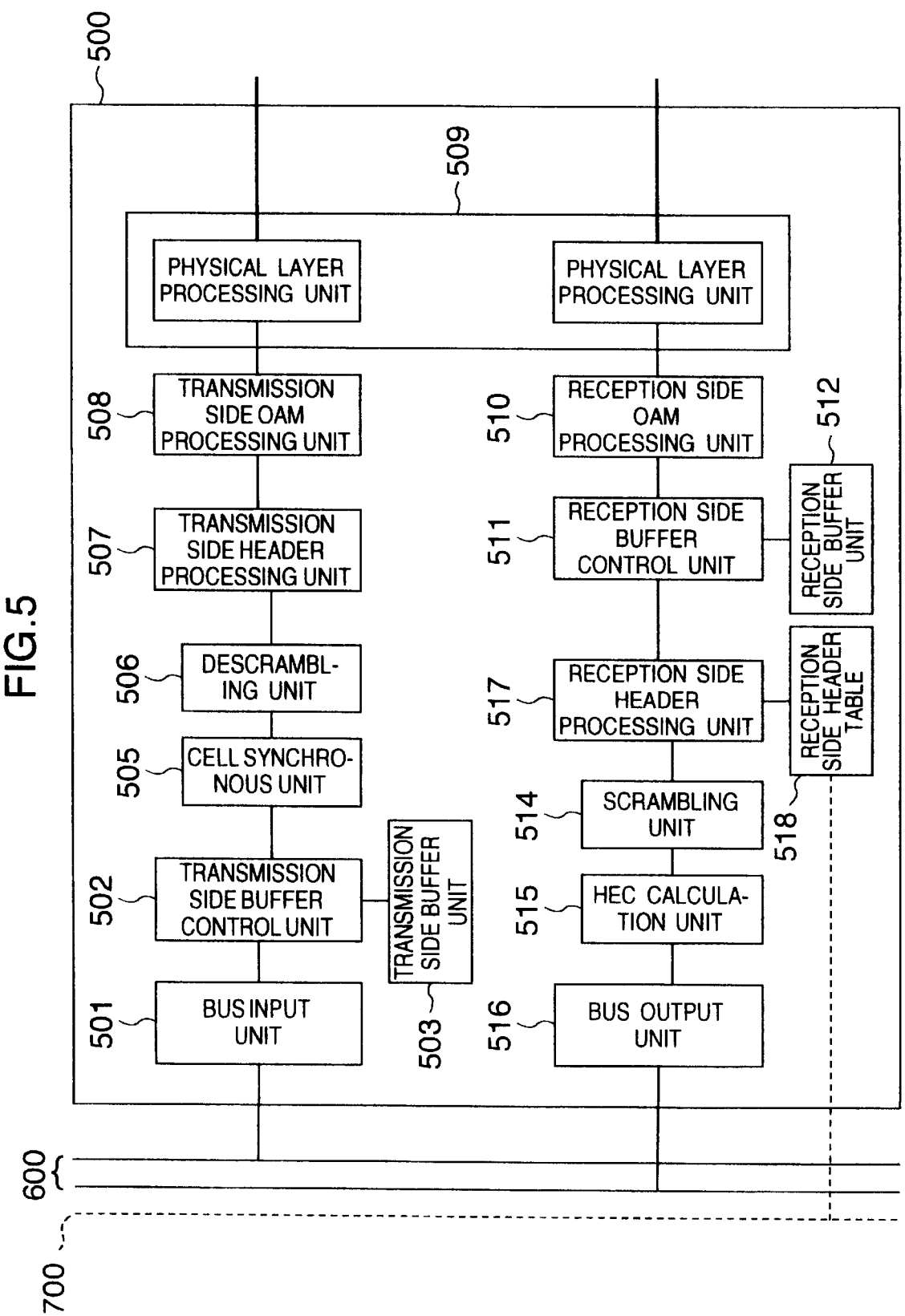
FIG. 5 is a block diagram schematically illustrating a high-speed interface unit.

FIG. 5 schematically illustrates the high-speed interface unit 500.

As shown in FIG. 5, the high-speed interface unit 500 includes a bus input unit 501, a transmission side buffer control unit 502, a transmission side buffer unit 503, a cell synchronizing unit 505, a descrambling unit 506, a transmission side header processing unit 507, a transmission side OAM processing unit 508, a physical layer processing unit 509, a reception side OAM processing unit 510, a reception side buffer control unit 511, a reception side buffer unit 512, a scrambling unit 514, a HEC calculation unit 515, a reception side header processing unit 517, a reception side header table 518 and a bus output unit 516.

With such a configuration, the bus input unit 501 receives signals transmitted by the LAN interface units 100 at time slots on the time division bus 600. The transmission side buffer control unit 502 stores the signals received by the bus input unit 501 in the transmission side buffer 503 for each of the LAN transmission paths on the low-speed side.

The transmission side buffer control unit 502 manages an amount of the signals stored in the transmission buffer 503 and storage locations for each of the LAN transmission paths and sends the stored ATM cell to the cell synchronizing unit 505.

In other words, the transmission side buffer control unit 502 sends the signals stored in the transmission buffer 503 to the cell synchronizing unit 505 for each byte designated from the cell synchronizing unit 505.

The cell synchronizing unit 505 performs the process in synchronism with the ATM cell and corrects the ATM header on the basis of the HEC contained in the ATM header.

The synchronous control of the ATM cell is now described in brief.

The synchronous control of the ATM cell is performed by transition of three states including a hunting state that the HEC of the ATM cell cannot be detected, a presynchronization state for confirming that the process subsequent to the hunting state is successively synchronized with the ATM cell by a predetermined number of times and a synchronization establishment state for detecting that the process is not successively synchronized with the ATM cell by a predetermined number of times when it is confirmed that the process is successively synchronized with the ATM cell by a predetermined number of times in the presynchronization state. That is, when the HEC of the ATM cell can be detected in the hunting state, the synchronous control moves to the presynchronization state. When it is confirmed that the process is successively synchronized with the ATM cell by the predetermined number of times in the presynchronization state, the synchronous control moves to the synchronization establishment state. When it is detected that the process is not successively synchronized with the ATM cell by the predetermined number of times in the synchronization establishment state, the synchronous control moves to the hunting state.

Further, when it is detected that the process is not successively synchronized with the ATM cell in the presynchronization state, the synchronous control moves to the hunting state.

In the cell synchronizing unit 505, the synchronization of the process and the ATM cell corresponds to the state that the signal is read out from the transmission buffer exactly in a unit of the ATM cell and the ATM header is corrected on the basis of the HEC contained in the ATM header.

In HEC detection unit 5051, a synchronous state control unit 5053 manages the three synchronous states described above and requires the transmission side buffer control unit 502 to send signals in the transmission side buffer 503 by 53 bytes when it is in the hunting state. In the hunting state, the CRC calculation unit 5052 regards the bytes sent from the transmission side buffer 503 as the HEC and compares the bytes regarded as the HEC with the CRC of 4 bytes positioned before the HEC. When the bytes regarded as the HEC is coincident with the CRC, the bytes regarded as HEC is assumed to be HEC. This reason is that the HEC is positioned in the fifth byte of the ATM header of the ATM cell and expresses a CRC of 4 bytes positioned before the HEC.

As described above, in the hunting state, when the HEC is detected, the HEC detection control unit 5051 reports movement to the presynchronization state to the synchronous state control unit 5053. Further, HEC detection control unit 5051 reports m=5−h+53 calculated on the basis of a position h in 53 bytes read from the transmission side buffer 503 and from which the HEC is detected, to the synchronous state control unit 5053. In the presynchronization state, the synchronous state control unit 5053 which has received the position h−5 requires the transmission side buffer control unit 502 to discard the first m bytes of the signal stored in the transmission side buffer 503 and send the subsequent 53 bytes.

Thus, the CRC calculation unit 5052 detects the HEC with respect to the above 53 bytes in the same manner as described above. The HEC detection control unit 5051 reports m calculated from the position in 53 bytes read from the buffer 503, to the synchronous state control unit 5053 in the same manner as described above. The synchronous state control unit 5053 requires the transmission side buffer control unit 502 to discard the first m bytes of the signal stored in the transmission side buffer 503 and send the subsequent 53 bytes.

On the other hand, the HEC detection control unit 5051 counts the number of times that the fifth byte is HEC successively in the presynchronization state (the number of times that h−5 is 0 successively) and when the number of times reaches a predetermined number of times, the HEC detection control unit 5051 reports movement to the synchronization establishment state to the synchronous state control unit 5053.

The synchronous state control unit 5053 in the synchronization establishment state neglects m sent from the CRC calculation unit 5052 and requires the transmission side buffer control unit 502 to send the signal stored in the transmission side buffer 503 by 53 bytes. On the other hand, the CRC calculation unit 5053 detects the HEC with respect to 53 bytes in the same manner as described above. The HEC detection control unit 5051 counts the number of times that the fifty byte is not HEC successively (the number of times that h–5 is not 0 successively) in the synchronization establishment state, and when the number of times reaches a predetermined number of times, the HEC detection control unit 5051 reports movement to the synchronization establishment state to the synchronous state control unit 5053.

Thereafter, the state is moved between the presynchronization state and the synchronization establishment state in the same manner. Movement to the hunting state is usually made only in the initial state.

On the other hand, in the cell generation, the signal sent from the transmission side buffer 503 by 53 bytes is once buffered in the synchronization establishment state and thereafter is read selectively to be subjected to the header correction process. The header correction process is made on the basis of the HEC in the fifth byte contained in the header of the ATM cell when an error in the ATM header can be corrected and its result is produced.

On the other hand, in the hunting state and the presynchronization state, an idle cell written in the buffer is selected and produced.

Referring back to FIG. 5, the descrambling unit 506 which has received the ATM cell produced by the cell synchronization unit 505 performs the descrambling process of the ATM cell and sends it to the header processing unit 507.

The header processing unit 507 produces the HEC and then sends the ATM cell to the physical layer processing unit 509 through the transmission side OAM processing unit 508.

The physical layer processing unit 509 receives the ATM cell sent in the manner and multiplexes the ATM cell in accordance with the protocol of SDH n or OC-n. The unit 509 converts it into a light signal or the like and transmits the signal to the high-speed transmission path.

When the ATM cell sent to the physical layer processing unit 509 is the OAM cell, the transmission side OAM processing unit 508 takes in it and performs management and control in accordance with its contents.

On the other hand, with respect to the reception from the high-speed transmission path, the physical layer processing unit 509 separates the signal received from the high-speed transmission path into the ATM cell and sends the separated ATM cells through the reception side OAM processing unit 510 to the reception side buffer control unit 511 to be once stored in the reception side buffer unit 512.

When the ATM cell sent from the physical layer processing unit 509 is the OAM cell, the reception side OAM processing unit 510 takes in the cell and performs management and control in accordance with its contents.

The ATM cells stored in the reception side buffer unit 511 are successively sent to the reception side header processing unit 517 and the contents of the ATM header are analyzed. The LAN interface unit 100 to which the ATM cells are to be sent is judged in accordance with the reception side header table 518 and the ATM cells are sent to the scrambling unit 514. The VPI and VCI of the ATM cells notified from the control unit 123 of the LAN interface units 100 and received from the ATM switch 30 to be sent to the transmission path corresponding unit 120 are registered in the reception side header table 518 by the unit controller 50 of FIG. 2 in correspondence to the transmission path corresponding units 120 of the LAN interface unit 100. With respect to the defaulted VPI and VCI 0/15, all of the transmission path corresponding units 120 of all LAN interface units 100 are registered as the transmission path corresponding units which are to send the ATM cells.

In the scrambling unit 514, the payload of the sent ATM cell is subjected to the scrambling process and is sent to the HEC calculation unit 515. The HEC calculation unit 515 calculates the HEC of the ATM header of the ATM cell and rewrites the HEC of the ATM header in the calculated HEC to be sent to the bus transmission unit 516.

The bus transmission unit 516 transmits the sent signals to the time division bus while multiplexing the signals in the position assigned to the low-speed transmission path to which the ATM cells transmitting the signals are to be sent, of the time slot assigned to the LAN interface unit accommodated in the low-speed transmission path in accordance with the LAN interface unit 100 to which the ATM cells transmitting the signals are to be sent.

The foregoing description has been made to the multiplexer 20.

In the multiplexer 20, the AAL 5 process, the generation of the ATM cell and the termination process in the LAN interface unit 100 are not required to be performed in the LAN interface unit 100 and may be performed in the high-speed interface unit 500. More particularly, in the high-speed interface unit 500, the AAL process and the generation process of the ATM cell performed in the LAN interface unit 100 may be made with respect to the signals read from the transmission side buffer 503 and the AAL 5 process and the termination process of the ATM cell performed in the LAN interface unit 100 may be made with respect to the signals read from the reception side buffer unit 512.

In FIG. 1, the ATM cell inputted to the ATM switch 30 is once stored in the buffer 301 and then inputted to the switch unit 302. The switch unit 302 exchanges the ATM cell in accordance with values of the VPI and VCI of the ATM header of the ATM cell. That is, the ATM cell having the VPI and VCI inputted to the switch unit 302 from the multiplexer 20 and which have the defaulted 0/15 is outputted to the IP switch controller 80. Further, the ATM cell having the VPI and VCI inputted from the IP switch controller and which have the defaulted 0/15 is outputted to the multiplexer 20. The ATM cell having the VPI and VCI which do not have the defaulted 0/15 performs exchange and rewrite of the VPI and VCI on the basis of the setting from the system controller 60.

When the IP switch controller 80 receives the ATM cell from the ATM switch 30, the IP switch controller restores the IP packet in the same manner as in the transmission path corresponding unit 120 and when the IP packet does not contain the IFMP message, the routing process in accordance with the IP address of the IP packet is performed. That is, the destination of the IP packet is determined in accordance with the routing table provided therein and the ATM cell is formed from the IP packet again in the same manner as in the transmission path corresponding unit 120. The ATM packet is sent to the ATM switch 30 while designating the defaulted VPI and VCI 0/15 when the destination of the IP packet is the LAN connected to the multiplexer 20. When the destination of the IP packet is the ATM network, the ATM packet is sent to the ATM switch 30 while designating the VPI and VCI which are exchanged to the ATM network side in accordance with the destination of the IP packet.

Further, in this case, the IP switch controller investigates the service of the flow to which the IP packet from which the ATM packet from the multiplexer 20 is restored belongs and when it is the service (FTP, HTTP, NFS, etc.) having a heavy traffic, the IP switch controller gives a new label to the flow when the flow does not have a label. The IP switch controller determines new VPI and VCI for receiving the flow and produces the IP packet including the IFMP message having the effect that transmission of the ATM cell of the flow is required, the label of the flow, and information such as the source, the destination, the protocol and the service of the IP packet for specifying the flow by the VPI and VCI. The ATM cell is formed from the IP packet and is sent to the ATM switch 30 while designating the defaulted VPI and VCI 0/15. The IP switch controller receives acknowledgment for requirement and receives requirement by the IFMP message, of transmission by the new VPI and VCI, for the flow, from the transmission path corresponding unit 120 of the LAN interface unit 100 on the reception side of the flow. When an acknowledgment is given thereto, the IP switch controller instructs the system controller 60 to set the ATM switch so that the ATM packet of the VPI and VCI required to the transmission side of the flow is exchanged in the multiplexer 20 while the VPI and VCI are converted into the VPI and VCI required from the reception side of the flow. The system controller 60 sets the switch unit 301 of the ATM switch 30 in accordance with the instructions. The flow is then routed directly by the ATM switch 30.

The QoS unit 70 monitors the accumulation situation of the ATM cells stored in the buffer of the input/output unit 301 of the ATM switch 30 connected to the multiplexer 20 and sent from the multiplexer 20 by means of the system controller 60. When an overflow of the buffer of the ATM cells is expected due to the fact that the remainder of the buffer is smaller than a predetermined amount or the like, the QoS unit 70 gives instructions to the shaping unit 106 of the transmission path corresponding unit 120 of the LAN interface units 100 through the system controller 60 and the unit controller 50 to execute the traffic control.

In FIG. 3, when the shaping control unit 111 of the shaping unit 106 is instructed to execute the traffic control, the shaping control unit 111 stops reading of the ATM cells from the ATM cell buffer 112 or reduces a reading rate. Further, when the overflow of the buffer of the ATM cells is expected due to the fact that the remaining capacity of the ATM cell buffer 121 is reduced or the like, the ATM cell having the CLP of the ATM header which represents non-preference is abolished.

When there is no possibility that the buffer of the input/output unit 301 is overflown by the ATM cells sent from the multiplexer 20, the QoS unit 70 gives instructs to the shaping unit 106 of the transmission path corresponding unit 120 of the LAN interface units 100 through the system controller 60 and the unit controller 50 to stop the traffic control. The shaping control unit 111 given the instructions stops the traffic control described above.

The QoS unit 70 may performs monitoring of the transmission rate for each of the VPI and VCI, instructions of the traffic control about the ATM packet of the VPI and VCI having the transmission rate exceeding an allowable level and the like in addition to the above traffic control.

The router apparatus according to the embodiment has been described.

According to the router apparatus of the embodiment, the router apparatus using the ATM switch can perform the traffic control in cooperation with the LAN interface unit for performing interface to the LAN and the ATM switch unit. Further, the configuration of the embodiment in which the plurality of LAN interface units 100 are connected to the high-speed interface unit 500 through the bus and the ATM cells of the LAN interface unit 100 are multiplexed in the high-speed interface unit 500 to be sent to the ATM switch 30 is an excellent structure which is easy to handle and can reduce the number of necessary physical transmission paths. The high-speed interface 500 can perform the processes common to the LAN interface units 100 collectively. Furthermore, since transmission and reception of signals between the LAN interface units 100 and the high-speed interface unit 500 are performed using the time slot assigned fixedly, the burden of transmission and reception of the ATM cells in the LAN interface units 100 can be reduced.

Figure 7A:
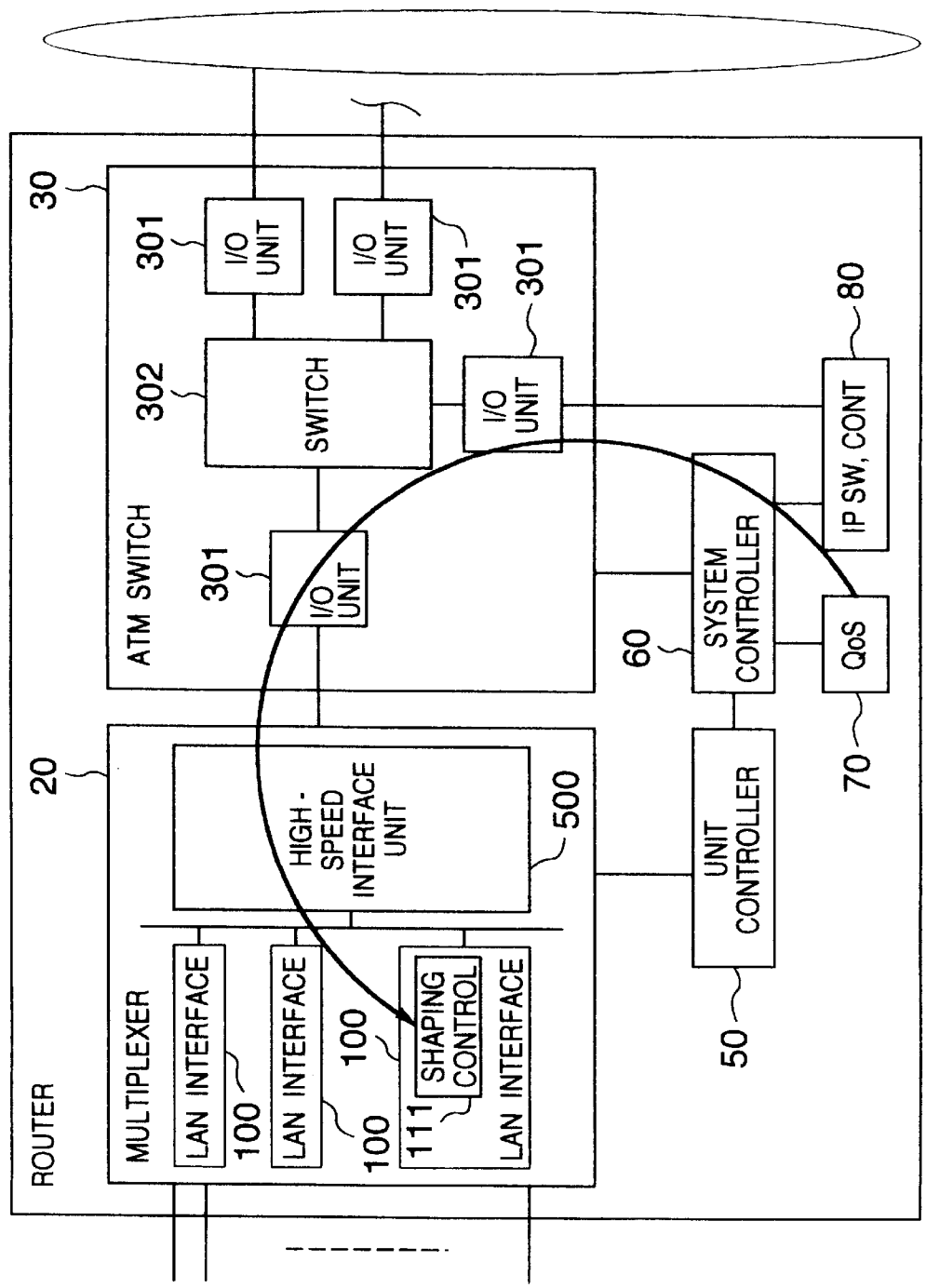
FIGS. 7a and 7b are block diagrams schematically illustrating router apparatuses.

In the above description, the QoS unit 70 performs communication with the shaping control unit 111 of the shaping unit 106 of the transmission path corresponding unit 120 of the LAN interface units 100 through the system controller 60 and the unit controller 50. However, communication from the QoS unit 70 to the shaping control unit 111 may be made as shown in FIG. 7a so that the contents of instructions are supplied to the IP switch controller 80 and the IP switch controller 80 sends the instructions to the IFMP processing unit 113 of the LAN interface units 100 as the IFMP message which is then sent from the IFMP processing unit 113 to the shaping unit 106.

Figure 7B:
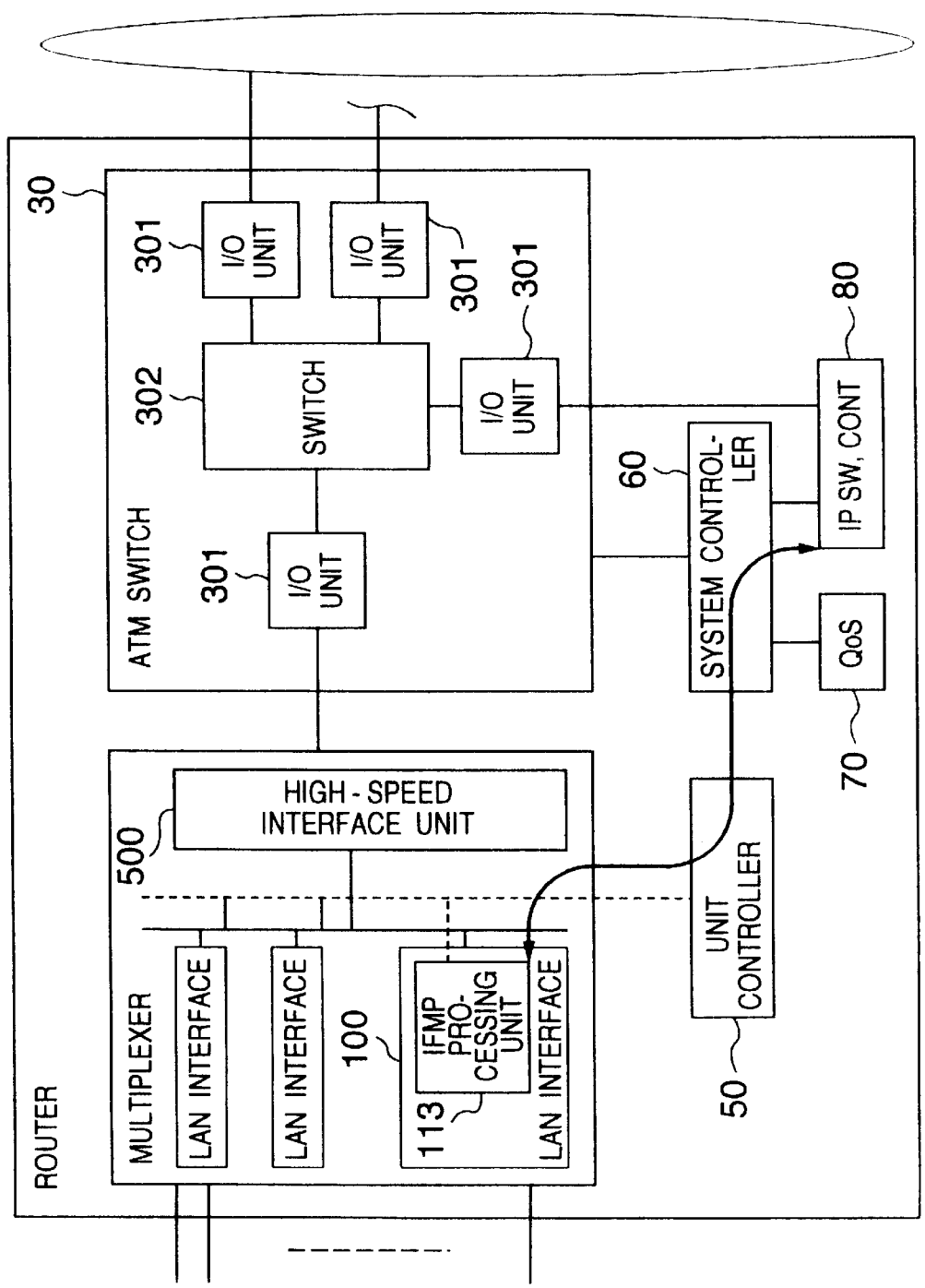
Figure 8:
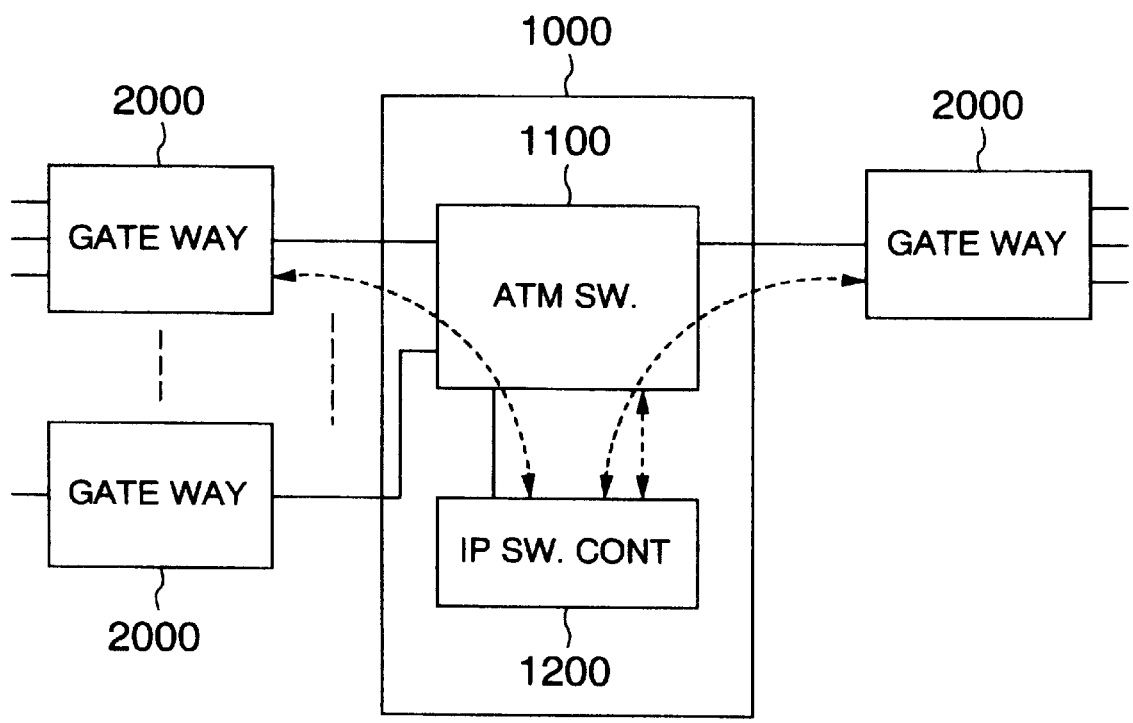
FIG. 8 is a block diagram schematically illustrating a conventional router apparatus.

Conversely, as shown in FIG. 7b, transmission and reception of the IFMP message between the IP switch controller 80 and the IFMP processing unit 113 may be performed through the unit controller 50 and the system controller 60. In this case, it is not necessary to form the IP packet and the ATM packet from the IFMP message. In this manner, the efficiency of utilizing the physical transmission path which transmits the ATM cell can be increased.

As described above, according to the present invention, there can be provided the router apparatus using the ATM switch and capable of performing various controls such as traffic control more effectively.

We claim:

1. A router apparatus using an ATM switch to make routing of IP packets, comprising:

a multiplexer inputted with the IP packets from a network which transmits IP packets for producing corresponding ATM cells from the inputted IP packets so as to multiplex the produced ATM cells;

an ATM switch unit which exchanges the ATM cells produced from said multiplexer so as to provide the ATM cells to an ATM network, said ATM switch further comprising a buffer that stores the ATM cells;

a controller that routes the IP packets and monitors accumulation of the ATM cells stored in said ATM switch unit buffer said controller generating instructions to said multiplexer to stop sending the produced ATM cells to said ATM switch and to reduce a sending rate of the ATM cells to said ATM switch when a remainder of said buffer of said ATM switch is smaller than a predetermined amount and to discard the ATM cells produced when an overflow of said buffer is indicated;

said multiplexer including a plurality of first interface units connected to the IP network and a second interface unit connected to said ATM switch unit;

each of said first interface units including a plurality of transmission path corresponding units corresponding to a flow of the IP packets;

each of said transmission path corresponding units including a shaping unit which stops sending the ATM cells produced from said received IP packets and provided to said ATM switch via said second interface unit and reduces a sending rate of the ATM cells provided to said ATM switch from said first interface unit, and discards the ATM cells in accordance with the instruction from said controller.

2. A router apparatus using an ATM switch to make routing of IP packets comprising:

a multiplexer inputted with the IP packets from a IP transmitting network for producing corresponding ATM cells from the inputted IP packets so as to multiplex the produced ATM cells;

an ATM switch unit which exchanges the ATM cells produced from said multiplexer to provide the ATM cells to an ATM network said ATM switch unit including a buffer for storing the ATM cells;

a quality controller which monitors accumulation situation of the ATM cells stored in said buffer of the ATM switch unit and generates instructions to the multiplexer so that said multiplexer stops sending the produced ATM cells to said ATM switch and reduces a sending rate of the ATM cells produced to said ATM switch when a remainder of said buffer of said ATM switch is smaller than a predetermined amount and discards the ATM cells produced when an overflow of said buffer of the ATM cells is expected due to a fact that a remaining capacity of said buffer of said ATM switch is further reduced than the predetermined amount;

said multiplexer comprising:

a first interface including a line corresponding unit having an IP packet unit for receiving the IP packets, an ATM cell producing unit for producing ATM cells in accordance with a mark indicative of a priority of the ATM cells in accordance with service of the received IP packets, and a shaping unit which stops sending the ATM cells produced and reduces a sending rate of the ATM cells produced to said ATM switch and discards the ATM cells with low priority produced in accordance with the instruction from said quality controller, and a data multiplexer unit for multiplexing the ATM cells processed by said shaping unit; and a second interface for synchronizing the ATM cells produced from said first interface.

3. A router apparatus using an ATM switch to make routing of IP packets, comprising, an ATM switch for exchanging ATM cells in accordance with VPI and VCI included in the ATM cells, a plurality of interface units connected to a network which transmits the IP packets, and an IP switch controller for making routing of the IP packets, each of said interface units including means for forming an ATM cell from a flow of the IP packets received from the connected network and transmitting to said ATM switch the ATM cell with specific VPI and VCI set to said flow in cooperation with said IP switch controller, means for receiving the ATM cells transmitted from said ATM switch and restoring the flow of the IP packets to transmit it to the connected network, means for setting specific VPI and VCI for the flow restored from the ATM cells received from said ATM switch in cooperation with said IP switch controller, and means for limiting transmission of the ATM packets to the ATM switch when traffic control is instructed from said IP switch controller, said IP switch controller including means for setting specific VPI and VCI for the flow of the IP packets in cooperation with the interface unit for source of the flow of the IP packets, setting specific VPI and VCI for the flow in cooperation with the interface unit for destination of the flow and setting contents of exchange of the ATM cells performed said ATM switch so that the ATM packets from the interface unit for source including the specific VPI and VCI set in cooperation with the interface unit for source are exchanged to the interface unit for destination as the ATM cells including VPI and VCI set in cooperation with the interface unit for destination, means for instructing said interface unit to perform traffic control when congestion occurs in said ATM switch or when occurrence of congestion is expected, and means for routing the ATM cells including the IP packets of the flow on the basis of an IP address included in the IP packet when the VPI and VCI for the flow are not set with respect to both of the interface unit for source and the interface unit for destination of the flow.

4. A router apparatus using an ATM switch to make routing of IP packets, comprising, an ATM switch for exchanging ATM cells in accordance with VPI and VCI included in the ATM cells, a plurality of interface units connected to a network which transmits the IP packets, an IP switch controller for making routing the IP packets and a transmission path for message independent of a transmission path for the ATM cells and for transmitting and receiving messages between said interface units and the IP switch controller, each of said interface units including means for forming an ATM cell from a flow of the IP packets received from the connected network and transmitting to said ATM switch the ATM cell with specific VPI and VCI set to said flow by exchanging a message with said IP switch controller through said transmission path for message, means for receiving the ATM cells transmitted from said ATM switch and restoring the flow of the IP packets to transmit it to the connected network, and means for setting the specific VPI and VCI for the flow restored from the ATM cells received from said ATM switch by exchanging a message with said IP switch controller through said transmission path for message, said IP switch controller including means for setting specific VPI and VCI for the flow of the IP packets by exchanging a message with the interface unit for source of the flow of the IP packets through said transmission path for message, setting specific VPI and VCI for the flow by exchanging a message with the interface unit for destination of the flow through said transmission path for message and setting contents of exchange of the ATM cells performed by said ATM switch so that the ATM packets from the interface unit for source including the specific VPI and VCI set by exchanging a message with the interface unit for source are exchanged to the interface unit for destination as the ATM cells including VPI and VCI set by exchanging a message with the interface unit for destination, and means for routing the ATM cells including the IP packets of the flow on the basis of an IP address included in the IP packet when the VPI and VCI for the flow are not set with respect to both of the interface unit for source and the interface unit for destination of the flow.

5. A router apparatus using an ATM switch to make routing of IP packets, comprising, an ATM switch for exchanging ATM cells in accordance with VPI and VCI included in the ATM cells, a multiplexer connected to said ATM switch, a plurality of interface units connected to a network which transmits the IP packets, a time division multiplexing bus for connecting said multiplexer with said plurality of interface units, and an IP switch controller for making routing of the IP packets, each of said interface units including means for forming an ATM cell from a flow of the IP packets received from the connected network and transmitting to said multiplexer for time division multiplexing on said time division multiplexing bus the ATM cell with specific VPI and VCI set to the flow in cooperation with said IP switch controller, means for receiving the ATM cells from said multiplexer, which is time division multiplexed on said time division multiplexing bus and restoring the flow of the IP packets to transmit it to the connected network, and means for setting the specific VPI and VCI for the flow restored from the ATM cells received from said multiplexer in cooperation with said IP switch controller, said multiplexer including means for multiplexing the ATM cells received from said interface units on said time division multiplexing bus to transmit said multiplexed ATM cells to said ATM switch, and means for time division multiplexing the ATM cells received from said ATM switch onto said time division bus and transmitting the multiplexed ATM cells to the interface unit which instructs said IP switch controller to assign the VPI and VCI of said ATM cells thereto, said IP switch controller including means for setting specific VPI and VCI for the flow of the IP packets in cooperation with the interface unit for source of the flow of the IP packets, setting specific VPI and VCI for the flow in cooperation with the interface unit for destination of the flow and setting contents of exchange of said ATM switch so that the ATM packets from the interface unit for source including the specific VPI and VCI set in cooperation with the interface unit for source are exchanged to the interface unit for destination as the ATM cells including VPI and VCI set in cooperation with the interface unit for destination, and means for routing the ATM cells including the IP packets of the flow on the basis of an IP address included in the IP packet when the VPI and VCI for the flow are not set with respect to both of the interface unit for source and the interface unit for destination of the flow.

* * * * *

UNITED STATES PATENT AND TRADEMARK OFFICE
CERTIFICATE OF CORRECTION

PATENT NO. : 5,963,555
DATED : October 5, 1999
INVENTOR(S) : Takase, et al

It is certified that error appears in the above-indentified patent and that said Letters Patent is hereby corrected as shown below:

On the title page, item [73] Assignee, insert –Hitachi, Ltd, Japan –
        Under item [56] Attorney, Agent & Firm insert – SOFER & HAROUN, LLP --

Signed and Sealed this

Sixth Day of March, 2001

Attest:

NICHOLAS P. GODICI

Attesting Officer     Acting Director of the United States Patent and Trademark Office